Patented Nov. 7, 1922.

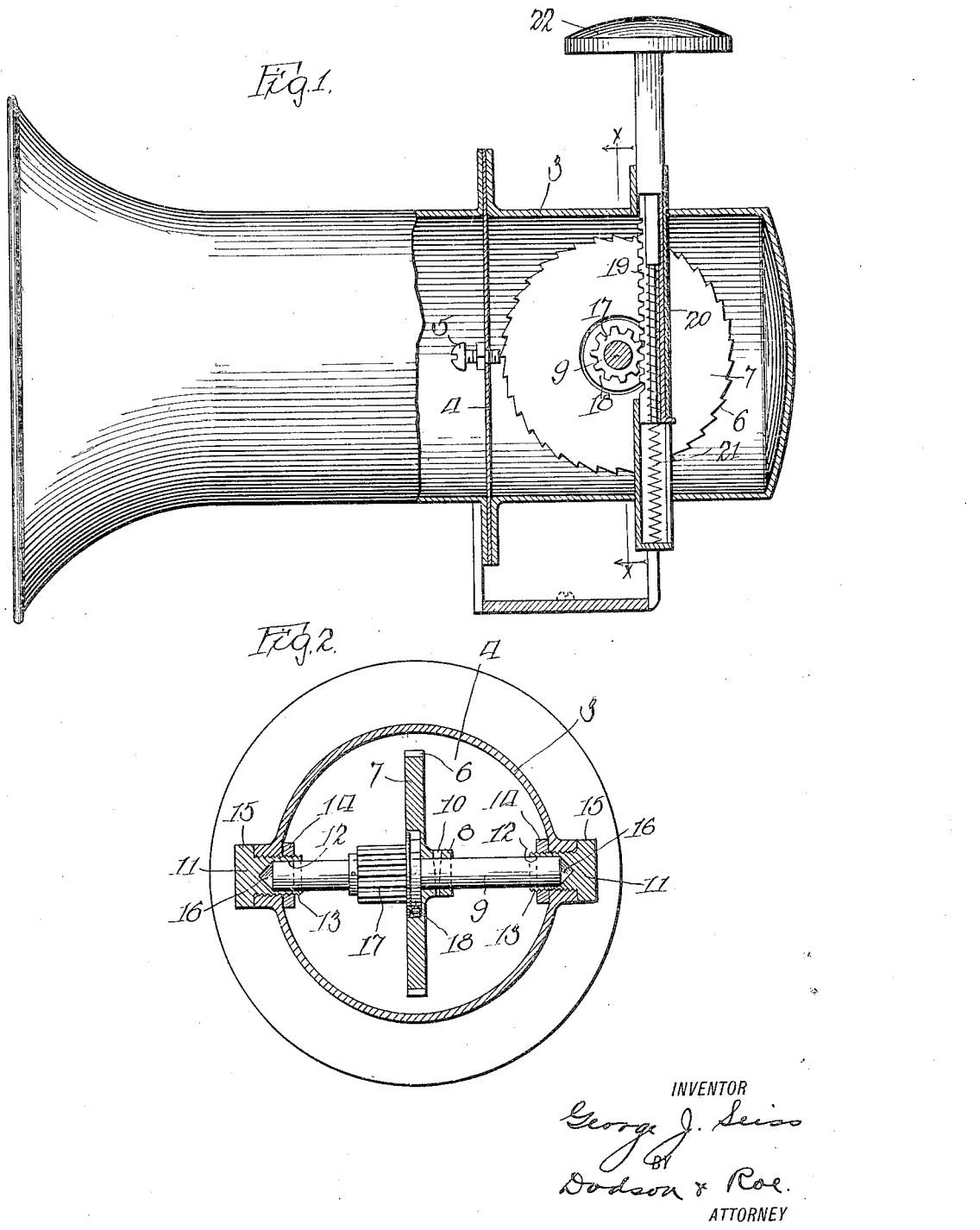

1,434,506

UNITED STATES PATENT OFFICE.

GEORGE J. SEISS, OF TOLEDO, OHIO.

AUTOMOBILE HORN.

Application filed March 11, 1918. Serial No. 221,603.

*To all whom it may concern:*

Be it known that I, GEORGE J. SEISS, a citizen of the United States, residing at Toledo, in the county of Lucas and State of Ohio, have invented a certain new and useful Improvement in Automobile Horns, of which the following is a specification.

My invention relates to that class of horns in which the sound is produced by the vibration of a diaphragm and relates more particularly to improving the means for mounting the serrated disc, the rotation of which causes the vibration of the diaphragm.

In horns of this type, with which I am familiar, the serrated wheel is loosely mounted upon the shaft, with the result that its continued rotation serves to wear its bearing surface away rapidly, and causes it to get so much out of its true and consequently to wabble, so as to require constant adjustment of the wearing piece mounted upon the diaphragm for engagement with the serrations upon the wheel.

My invention has for its object to provide a construction which will entirely eliminate this objectionable feature, and has for its further object to simplify the journal bearings for the shaft.

My means of accomplishing the foregoing objects may be more readily understood by having reference to the accompanying drawings, which are hereunto annexed and are a part of this specification, in which:

Fig. 1 is a longitudinal view partly in section of the horn, equipped with my improvement.

Fig. 2 is a cross section taken on the line x—x in Fig. 1.

Similar reference numerals refer to similar parts throughout the entire description.

As shown in the drawings, the horn consists of a body portion 3, which is provided with a diaphragm 4, in the center of which is mounted the wearing piece 5, adapted to engage the serrations 6, cut upon the periphery of the wheel 7. This wheel is provided with a laterally extending boss or hub 8, and is fixedly mounted upon a shaft 9, by means of a tapered pin 10, although any other suitable or convenient means of fastening may be employed if desired.

The ends of the shaft 9, are mounted in bearings 11, which are provided with a smooth internal portion 12, the exterior of which is provided with threads 13, upon which is mounted a lock nut 14, the bearing 11 being formed with a head 15, adapted to engage the side wall of the body portion 3. A countersunk recess 16, is provided in the interior of the bearing 11, which can be filled with grease, as serving to lubricate the shaft for a very considerable period of time.

Adjacent the wheel 7, I mount a pinion 17, which is free to revolve upon the shaft 9, and is provided with a ball clutch 18, such as is described in my copending application, Serial No. 221,601, filed March 11, 1918, although any suitable or desired one-way clutch mechanism may be employed for effecting engagement of the pinion with the disc.

The result of this construction is that inasmuch as the ends of the shaft 9, are mounted in bearings of considerable depth and of the same size as the diameter of the shaft itself, there is practically no tendency whatever for the shaft to wabble and the wheel being fixed upon the shaft obviously cannot wear away the shaft and thus get out of true, whereas the wear of the pinion on the shaft cannot have any detrimental effect upon the operation of the horn.

As shown in the drawings, the horn is mechanically operated through the medium of a rack 19, mounted in a sleeve 20, the coil spring 21, being mounted to hold the rack normally in a projected position, the teeth of the rack being in mesh with the teeth of the pinion. A button 22, is provided for the manual operation of the rack 19.

Although I have illustrated and described a mechanically operated horn, it will be apparent to persons skilled in the art that my improvement can be utilized in any type of automobile horn.

Having described my invention what I regard as new and desire to secure by Letters Patent of the United States, is:

1. A horn having a cylindrical body portion, a diaphragm, a shaft, a toothed wheel fixedly mounted on said shaft, provided with a laterally extending hub, a wear piece in the diaphragm which is engaged by said teeth, there being flanged openings in said body portion, a headed bearing nut threaded into said openings, a lock nut mounted on said bearing inside of the body portion, the ends of said shaft being journaled in said bearings, means actuated from the exterior of the cylindrical body portion to rotate said shaft and wheel.

2. A horn having a cylindrical body portion, a diaphragm, a shaft, a toothed wheel fixedly mounted on said shaft, a wear piece in the diaphragm which is engaged by said teeth, there being flanged openings in said body portion, bearings of substantially the same diameter as the shaft for the ends of said shaft detachably mounted in said openings, means to lock said bearings in position, the ends of said shaft being journaled in said bearings, a pinion revolvably mounted upon said shaft adjacent said wheel provided with a ball clutch to engage the pinion with the wheel, a rack to operate said horn, a sleeve in which said rack is mounted, a coil spring to hold said rack in a projected position, teeth formed on said rack in mesh with the teeth on the pinion and adapted to engage the same and manually operated means to operate said rack.

3. A horn having a cylindrical body portion, a diaphragm, a shaft, a toothed wheel fixedly mounted on said shaft, a wear piece in the diaphragm which is engaged by said teeth, there being flanged openings in said body portion, bearings of substantially the same diameter as the shaft for the ends of said shaft detachably mounted in said openings, means to lock said bearings in position, the ends of said shaft being journaled in said bearings, a pinion revolvably mounted upon said shaft adjacent said wheel provided with a ball clutch to engage the pinion with the wheel, a rack to operate said horn, a sleeve in which said rack is mounted, a coil spring to hold said rack in a projected position, teeth formed on said rack in mesh with the teeth on the pinion and adapted to engage the same and manually operated means to operate said rack, said bearings having a recess therein to contain a lubricant, means actuated from the exterior of the cylindrical portion to rotate said shaft and wheel.

In testimony whereof I have signed the foregoing specification.

GEORGE J. SEISS.